United States Patent
Ho et al.

(10) Patent No.: US 8,656,023 B1
(45) Date of Patent: Feb. 18, 2014

(54) OPTIMIZATION SCHEDULER FOR DEPLOYING APPLICATIONS ON A CLOUD

(75) Inventors: Ricky Ho, San Jose, CA (US); Jim Donahue, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 16 days.

(21) Appl. No.: 12/869,511

(22) Filed: Aug. 26, 2010

(51) Int. Cl.
*G06F 15/173* (2006.01)

(52) U.S. Cl.
USPC ........... 709/226; 709/224; 709/225; 709/205; 709/203

(58) Field of Classification Search
USPC ............... 709/226, 225, 205, 203; 705/80, 34
See application file for complete search history.

(56) References Cited

U.S. PATENT DOCUMENTS

| | | | | |
|---|---|---|---|---|
| 7,596,620 | B1 * | 9/2009 | Colton et al. | 709/226 |
| 2008/0059635 | A1 * | 3/2008 | Seiferth et al. | 709/226 |
| 2010/0050172 | A1 * | 2/2010 | Ferris et al. | 709/224 |
| 2011/0055399 | A1 * | 3/2011 | Tung et al. | 709/226 |
| 2011/0213712 | A1 * | 9/2011 | Hadar et al. | 705/80 |
| 2011/0295999 | A1 * | 12/2011 | Ferris et al. | 709/224 |

* cited by examiner

*Primary Examiner* — Kyung H Shin
(74) *Attorney, Agent, or Firm* — Schwegman Lundberg & Woessner, P.A.

(57) ABSTRACT

A system is provided to deploy a computing application on a cloud using optimization criteria. The system comprises a launch request detector to detect a request to launch a computing application within a virtualization service, an application requirement detector to determine application requirement for the computing application, a cloud resource inventory detector to determine cloud resource inventory, an optimization requirement detector, a matching module, and a configuration module. The optimization requirement detector may be configured to determine an optimization requirement. The matching module may be configured to perform matching of the application requirement with the resource inventory based on the optimization requirement. The configuration module may be configured to generate an optimized application deployment configuration based on the result of the matching and cause launching of the computing application within the virtualization service using the optimized application deployment configuration.

19 Claims, 6 Drawing Sheets

US 8,656,023 B1

OPTIMIZATION SCHEDULER FOR DEPLOYING APPLICATIONS ON A CLOUD

This disclosure relates generally to the technical fields of software and/or hardware technology and, in one example embodiment, to system and method to deploy a computing application on a cloud using optimized configuration.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The phrase "cloud computing" refers to an architectural paradigm, in which computation is moved from local servers to a remote service that provides computation as a commodity or utility. A "cloud" is typically a large collection of shared commodity computation resources that can be interchangeably provisioned in response to clients' computation requests. Cloud computing is frequently used in software-as-a-service (SaaS) application architectures and may be viewed as an implementation choice for application deployment that leverages shared resources and improved cost structure of the cloud. A cloud computing approach may be used to implement a variety of computational paradigms, such as virtual machines, jobs, remote procedure calls, traditional servers, etc.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
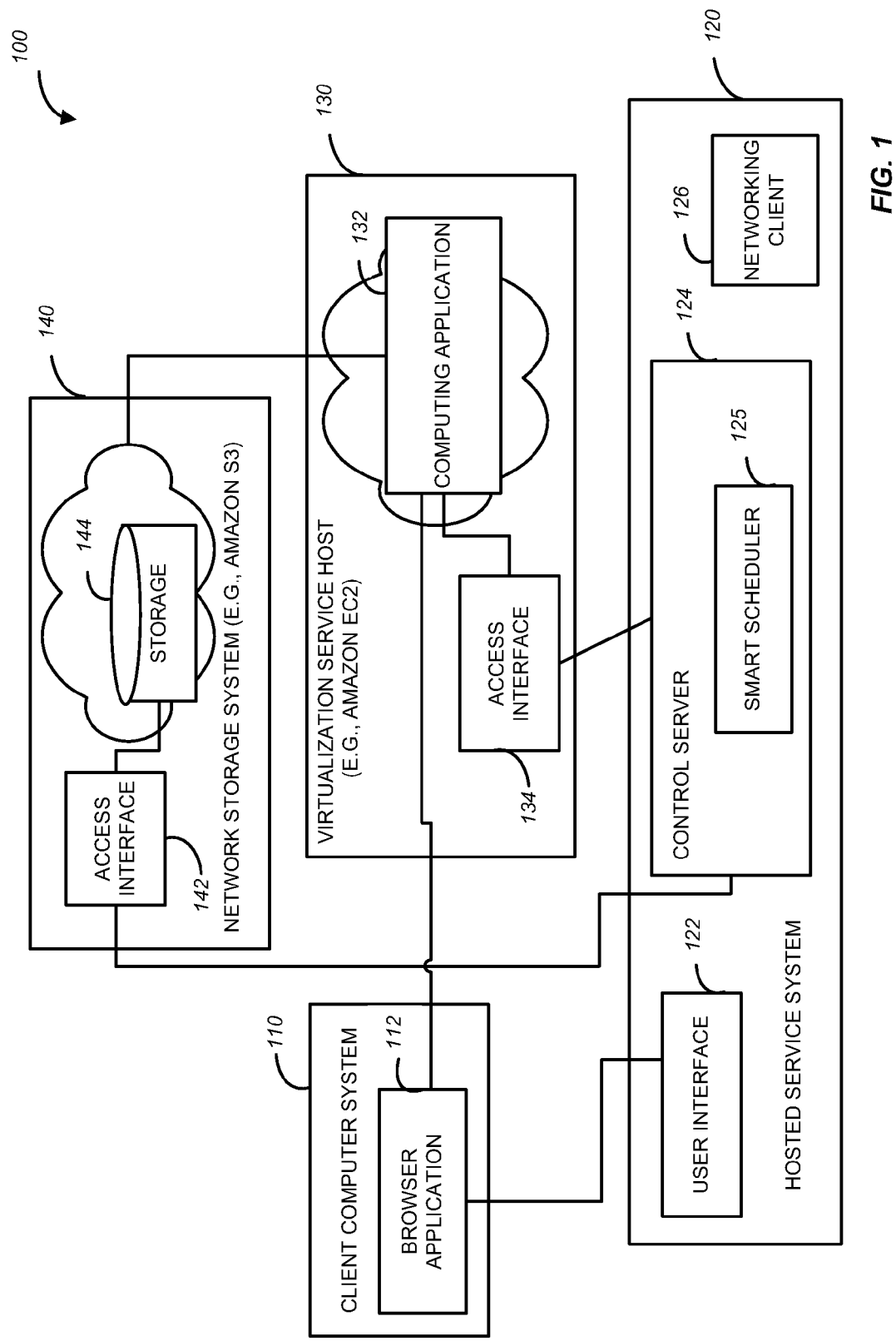
FIG. 1 is a block diagram showing an architecture within which a method and system to provision and manage a computing application deployed on a cloud may be implemented, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A computing application (also referred as merely an application) may be made available to users by deploying the application on one or more virtual instances of a machine running on a cloud, i.e., within a public virtualization space, such as, e.g., the virtualization space provided by Amazon Elastic Compute Cloud (EC2) service. The manner in which an application can be deployed on a cloud depends on application requirement with respect to resources on one hand, and also on the availability of resources (resource inventory) that can be provided to the application by the virtualization service provider. A virtualization service provider may also be referred to a cloud provider. Often, more than a single application deployment configuration may satisfy application requirement given a particular resource inventory. For example, an application may be deployed on a cloud using varying number of virtual instances of a machine, the application may be deployed using different or multiple virtualization service providers, the virtual instance of a machine running the application (or one or more components of an application) may be started and stopped according to the need of the users, etc. One of these different application deployment configurations may be most cost effective (e.g., deploying the application on a fewer number of virtual instances of a machine), while another application deployment configuration may be characterized by greater performance at a higher cost (e.g., deploying the application on a greater number of virtual instances of a machine).

In one embodiment, method and system are provided to determine the optimized configuration for deploying the application on a cloud based on a determined optimization goal. The optimization goal may be, e.g., the lowest cost, higher availability of the application to users, greater reliability, etc. The optimized configuration may be determined by matching application requirement with a resource model. A resource model, also termed resource inventory, may describe what type of resources (e.g., CPU, Disk, Memory, and Network) can be made available to the application, their capacity, and their usage charge. A system to determine the optimized configuration for deploying an application on a cloud may be termed a smart scheduler.

Application requirement may be provided to the smart scheduler together with a request to launch the application or, alternatively, the application may be registered with the smart scheduler, such that the application requirement information is obtained and stored at a location accessible by the smart scheduler prior to any launch request. A smart scheduler may also be configured to obtain resource inventory with respect to one or more cloud providers. In one embodiment, the resource inventory may be captured, e.g., by accessing a web site of the provider of a virtualization service. The optimization goal information may be provided to the smart scheduler, e.g., together with the request to launch an application or at the time when (and if) the application is registered with the smart scheduler.

The requested application is launched on a cloud by instructing the cloud provider to access one or more machine images containing the application description and load the one or more machine images onto the physical machines provided by the cloud provider and make it accessible to the user via a network. A machine image is a read-only boot image that is used for launching an instance of a virtual machine running one or more components of the requested computing application. One or more machine images representing a computing application may be provided to a network storage system (e.g., AmazonS3) by a control server (also referred to as a controller).

A system that provisions and manages a computing application hosted on one or more virtual instances of a machine may be referred to as a hosted service system. A hosted service system may include a smart scheduler and may be configured to provide automated administration of a computing application, replacing the administration tasks that would otherwise be performed by the customer when running in an on-premise production deployment. The technology within an example hosted service system may hide the behavior of the underlying virtualization service, and provide instances of a computing application that are substantially indistinguishable (e.g., in terms of reliability, security, and performance) from local on-premise deployments of the computing application. For example, a hosted service system may provision and manage computing applications such as a generic content server, Adobe® LiveCycle® Enterprise Suite (ES) and Adobe® ConnectPro® offered by Adobe Systems Incorporated, etc. While embodiments of the smart scheduler are described with reference to Amazon EC2 service, other virtualization services may be utilized.

In operation, a user can access a provider's web site and request to launch a computing application that can be deployed remotely on a plurality of virtual instances of a machine (on a cloud) such that the user no longer is required to deploy the computing application locally, within their own data center, on their own hardware. A request may be triggered by a user, e.g., by activating a visual control such as a "Start" button presented on a web page. When a smart scheduler provided at the hosted service system receives a request to launch a computing application on a cloud, the smart scheduler, in response, determines application requirement and a resource model based on a cloud resource inventory, and determines an optimized application deployment configuration. Then, a call is made to the application programming interface (API) associated with the virtualization service to trigger the loading of one or more machine images associated with the requested computing application using the optimized application deployment configuration. For example, the smart scheduler can instruct the virtualization service host to start ten small-capacity servers rather than five greater-capacity servers, if the ten-server configuration offers to the application the same CPU power at a lower cost. The smart scheduler may also be configured to instruct the virtualization service host to start a CPU-intensive task using a first virtualization service and start an I/O-intensive task using a different virtualization service, based on respective pricing models of the two virtualization service providers. The smart scheduler may also be configured to provide an instruction to start both the database server and the application server associated with a computing application in the same virtual network if it is determined that such configuration may lower the bandwidth cost.

An example architecture within which method and system to provision and manage a clustered computing application hosted by a plurality of virtual nodes may be implemented is described with reference to an architecture diagram illustrated in FIG. 1. The architecture 100 may include a client computer system 110 and a hosted service system 120. In one example embodiment, the hosted service system 120 is to provision and manage an enterprise SaaS product utilizing a cloud-based computing service as a virtualization infrastructure. Cloud-based computing services, as shown in FIG. 1, are provided by a virtualization service host 130 and a network storage service 140. In one embodiment, a hosted service system 120 utilizes Amazon EC2 as a virtualization service and Amazon Simple Storage Service (Amazon S3) as a network storage service. In some embodiments, the hosted service system 120 may utilize more than one virtualization service host, e.g., one host being Amazon EC2 and another host provided by Adobe Systems Incorporated. The client computer system 110 and the hosted service system 120 may be in communication with each other via a communications network that may be a public network (e.g., the Internet).

The virtualization service host 130 may load a computing application 132 onto a cloud. The computing application 132 may be accessed by the client 110 via a browser application 112. As mentioned above, a user in control of the client computer system 110 may send a request to the hosted service system 120 to load the computing application. The request may be initiated via a user interface 122 provided by the hosted service system 120 to the client computer system 110 via the browser application 112.

The user interface 122, in one embodiment, provides both an end-user's and a system administrator's view of the computing application 132 and also permits issuing control operations to the computing application 132 and permits viewing the resulting changes in the state of the computing application 132. For example, where the computing application is a content server, an end-user may manipulate various electronic forms. The user interface 122 may also serve as a source of information for the hosted service system 120, including documentation, downloads, and support. The user interface 122, in one embodiment, uses Adobe® Flex® software, offered by Adobe Systems Incorporated, as the user interface technology for the implementation of the user interface. The user interface 122, in one embodiment, uses an XML (Extensible Markup Language)-based representational state transfer (REST) style secure communications protocol to synchronize its operations with a control server 124. A request to access the user interface 122 may be authenticated using one of a variety of authentication techniques.

The request from the client computer system 110 to load the computing application 132 is received at the control server 124, which responds to the request by activating an access interface 134 provided by the virtualization service host 130. The control server 124, in one example embodiment, provides coordination between the components of the architecture 100, provides administration and monitoring of the virtualization service host 130, and also may be configured to audit system usage and resource allocation with respect to the computing application 132. The control server 124 includes a database to store information pertaining to various aspects of system usage. The control server 124, in one embodiment, runs within a standard Hypertext Transfer Protocol Secure (HTTPS)-compliant web server and may be deployed as a publically accessible web application that is available outside a firewall. The control server 124, in one embodiment, is implemented using Ruby on Rails™ technology.

The virtualization service host 130 accesses the storage 144 of the network storage system 140 to obtain one or more machine images in order to load the associated computing application 132. The machine images can be uploaded to the network storage system by the control server 124 utilizing an access interface 142 provided with the network storage system 140. The hosted service system 120 further includes a secure networking client 126 to provide a bidirectional, encrypted, compressed connection between a machine in the end-user's secure network environment (e.g., the client computer system 110) and one or more instances of a virtual machine running within the virtualization infrastructure (the computing application 132). The networking client 126 manages various aspects of transmission control protocol (TCP) traffic forwarding, encryption, and network discovery, such that the user can access the computing application 132 as if it was running locally on the user's machine. In this mode, the user's network security envelope is extended to surround the computing application 132 using comparable levels of encryption and protection against network security threats.

Figure 2:
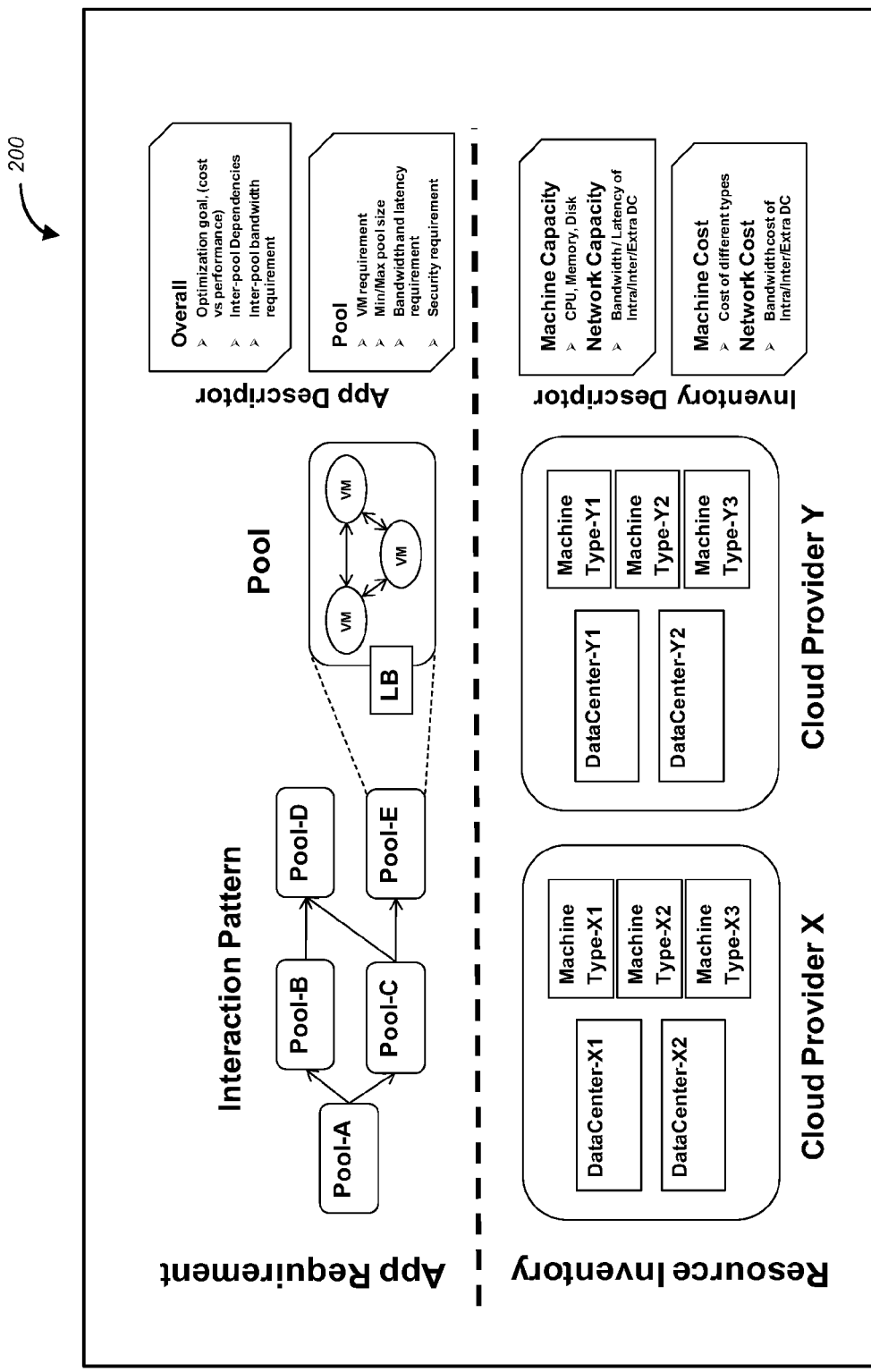
FIG. 2 is a diagrammatic representation of an example application requirement and an example resource inventory that may be used for determining a resource model, in accordance with an example embodiment.

In one example embodiment, the control server 124 comprises a smart scheduler 125. The smart scheduler 125 may be configured to determine an optimized configuration for launching a computing application on a cloud by matching the application resource requirement with the cloud resource model, based on the optimization requirement. The optimization requirement may be based on the need to lower the cost of using the virtualization service, based on the need to increase the bandwidth available to the computing application, to reduce latency, or some other optimization goals. A diagrammatic representation 200 of an example application requirement and an example resource inventory that may be used for determining the resource model is shown in FIG. 2. As shown in FIG. 2, an application requirement (AppRequirement) comprises interaction pattern among application pools, where a pool may be executing on one or more instances of a virtual machine with a load balance ("LB") being used as a front end for processing users requests. A "pool" is a group of machines that provide the same functionality to its clients. If the client workload is too high for the capacity the pool offers, the controller may issue an instruction to grow the pool by adding more members into the pool. The pools size is thus proportional to its processing capacity. Application requirement also comprises an application descriptor, which is the specification of the service-level requirement. Overall parameters of the application descriptor include optimization goal (also referred to as optimization requirement), inter-pool dependencies, and inter-pool bandwidth requirement. Pool parameters of the application descriptor include VM (virtual machine) requirement, minimum/maximum pool size, bandwidth and latency requirement, and security requirement. Resource inventory, as shown in FIG. 2, may indicate which cloud providers are available, which data centers (DSc) are provided by each cloud provider and the number and type of virtual instances of a machine that can be provided by each cloud provider. Resource inventory may be expressed utilizing inventory descriptors, such as machine capacity, network capacity, machine cost, and network cost. For example, if the application requires K amount of CPU power and the resource model indicates that a class-A machine can offer B units of CPU power, then the smart scheduler may determine that at least K/B machines would be necessary in order to meet the CPU requirement of the application.

Figure 3:
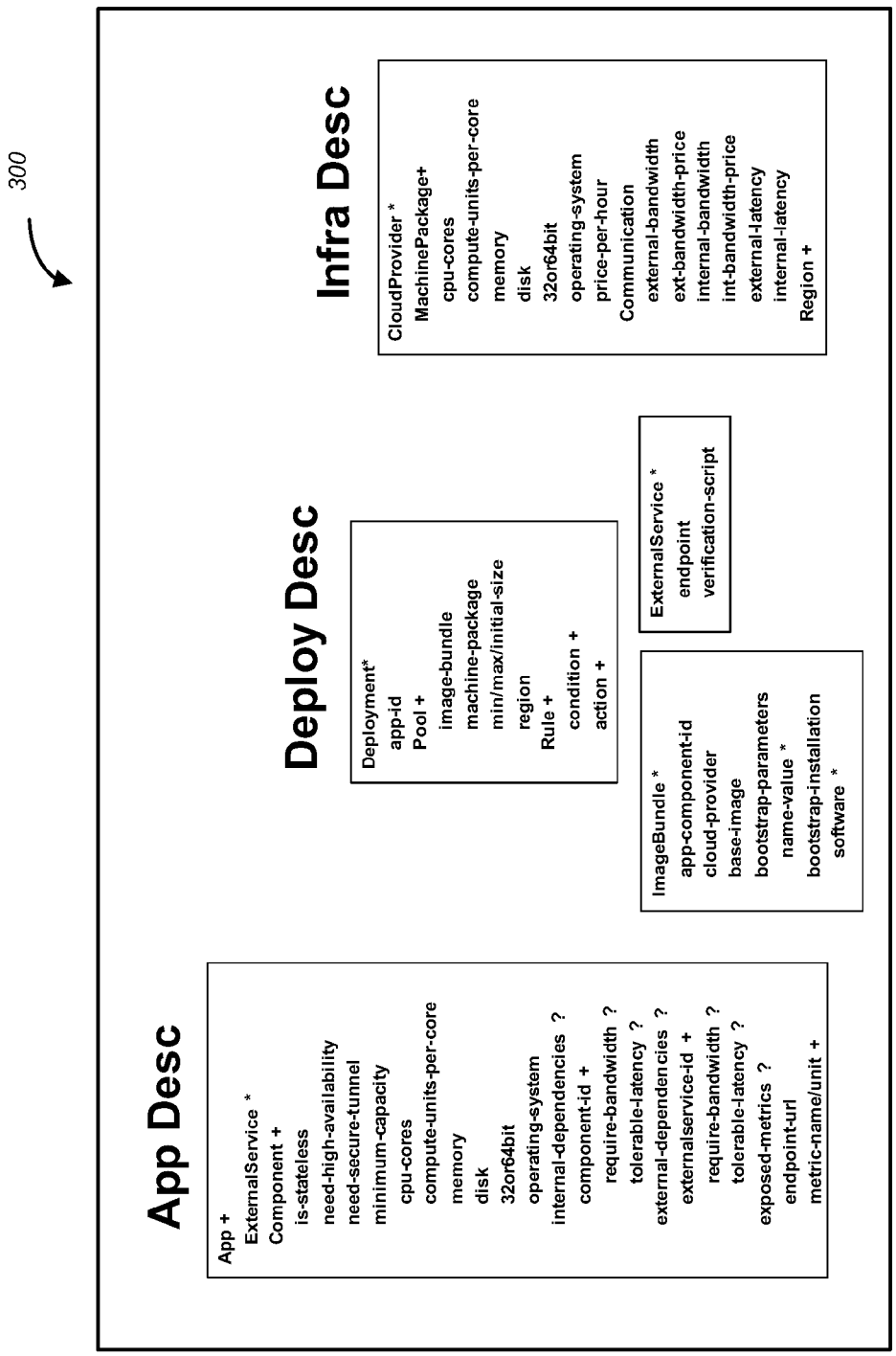
FIG. 3 is a diagrammatic representation of application description, deployment description, and infrastructure description, in accordance with an example embodiment.

FIG. 3 is a block diagram illustrating parameters that may be used for generating deployment parameters for a computing application ("Deploy Desc") using parameters describing application requirement of a computing application ("App Desc") and parameters describing cloud resource inventory ("Infra Desc"). Symbols "+," "*," and "?" describe the number of repetitions permitted with respect to the associated parameter. The "+" symbol indicates one to many parameters, the "*" symbol indicates zero to multiple parameters, and "?" indicates zero to one parameters. Some components of the smart scheduler 125 are described with reference to FIG. 4.

Figure 4:
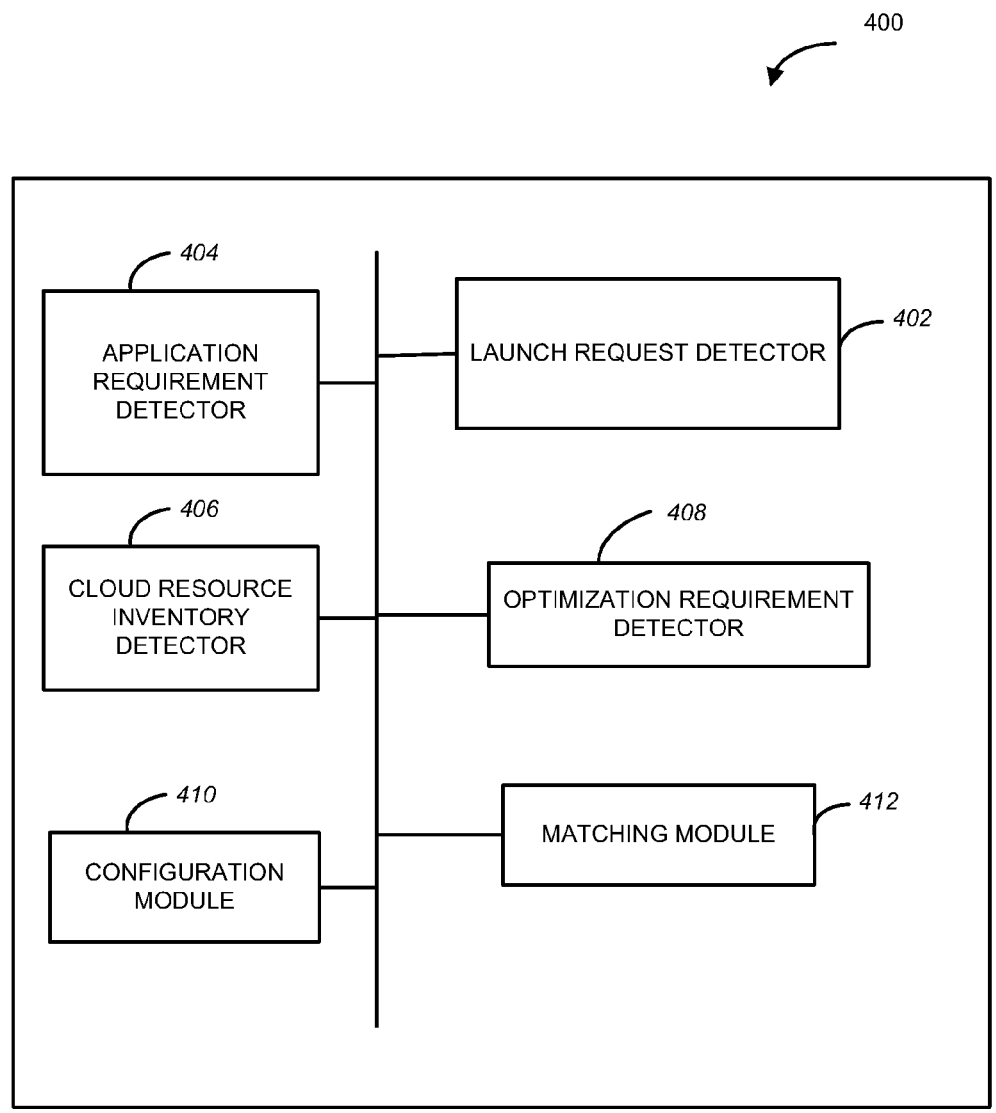
FIG. 4 is a block diagram illustrating some components of a smart scheduler, in accordance with an example embodiment.

FIG. 4 is a block diagram illustrating a system 400 for determining an optimized configuration for deploying a computing application on a cloud, according to one example embodiment. As shown in FIG. 4, the system 400 includes a launch request detector 402, an application requirement detector 404, a cloud resource inventory detector 406, an optimization requirement detector 408, a matching module 410, and a configuration module 412. The launch request detector 402 may be configured to detect a request to launch a computing application within a virtualization service. The application requirement detector 404 may be configured to determine application requirement for the computing application. The application requirement may comprise a list of components of the computing application, relationship among the components, bandwidth and latency requirement, security requirement, etc. The cloud resource inventory detector 406 may be configured to determine cloud resource inventory and generate a cloud resource model. Cloud resource inventory provides information indicating resources that can be made available to the computing application within the virtualization service. The optimization requirement detector 408 may be configured to determine an optimization requirement. The optimization requirement comprises one or more parameters indicating optimization criteria, such as, e.g., a requirement associated with the cost of using virtualization service, performance and availability of the computing application, etc. The matching module 410 may be configured to perform matching of the application requirement with the resource inventory based on the optimization requirement. The configuration module 412 may be configured to generate an optimized application deployment configuration based on the result of the matching and cause launching of the computing application within the virtualization service using the optimized application deployment configuration. The optimized application deployment configuration may include information indicating one or more virtualization service providers to be utilized for launching the computing application within the virtualization service, one or more virtualization service providers to be utilized for launching the computing application within the virtualization service, type and capacity of each virtual machine to be executing one or more components of the computing application, etc. Example operations performed by the system 400 are discussed below with reference to FIG. 5.

Figure 5:
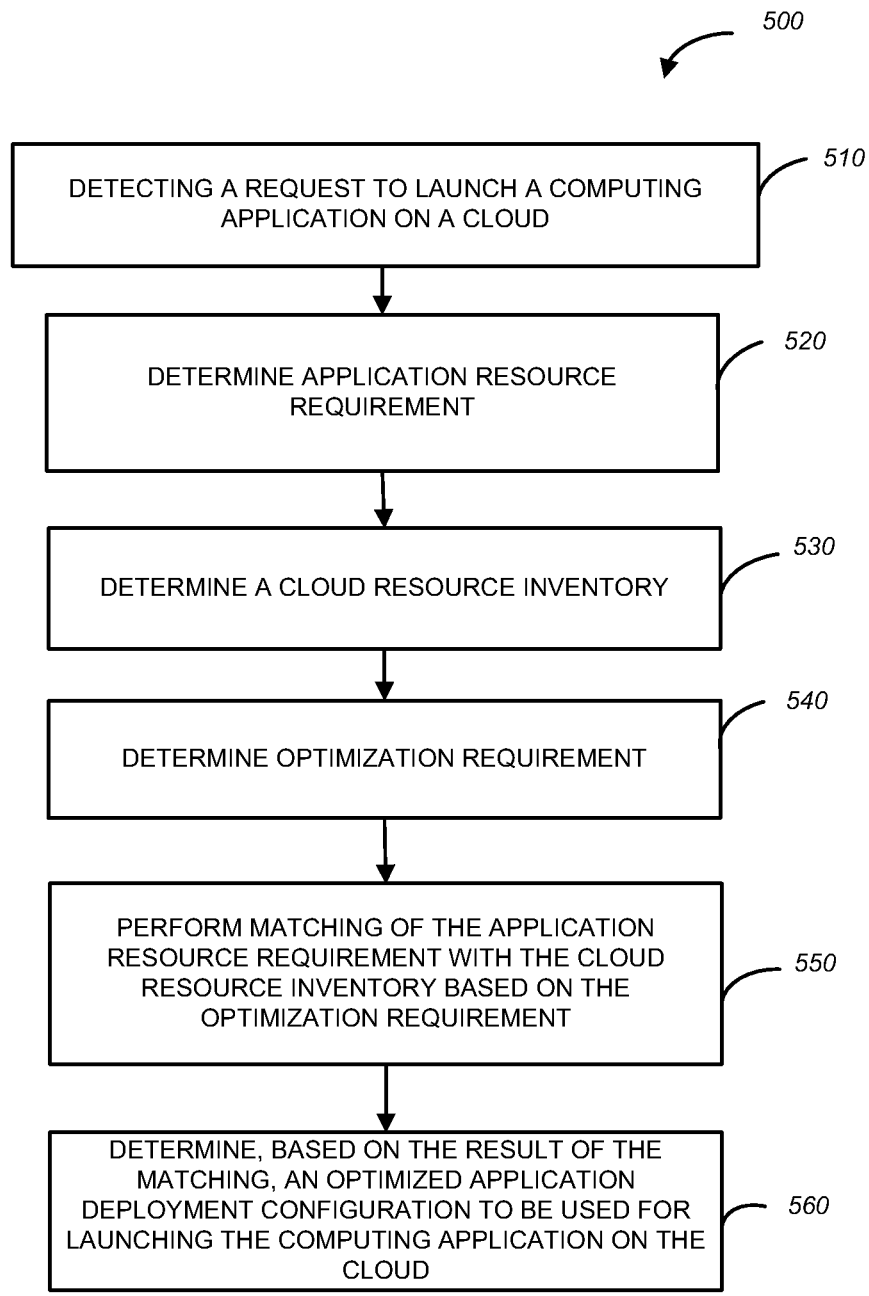
FIG. 5 is a flow chart illustrating a method for determining an optimized configuration for deploying a computing application on a cloud, in accordance with an example embodiment.

FIG. 5 is a flow chart illustrating a method 500 for determining an optimized configuration for deploying a computing application on a cloud, in accordance with an example embodiment. The method 500 may be performed by processing logic that may comprise hardware, software (such as run on a general purpose computer system programmed to perform particular functions pursuant to instructions from program software or on a dedicated machine), or a combination of both. The processing logic, according to example embodiments, may reside in or comprise any of the modules shown in FIG. 4.

As shown in FIG. 5, the method 500 commences with operation 510, where the launch request detector 402 of FIG. 4 detects a request to launch a computing application on a cloud (within a virtualization service). At operation 520, the application requirement detector 404 of FIG. 4 determines application requirement for the computing application. At operation 530, the cloud resource inventory detector 406 of FIG. 4 determines cloud resource inventory. As mentioned above, the cloud resource model indicates resources that can be made available to the computing application within the virtualization service. At operation 540, the optimization requirement detector 408 of FIG. 4 determines an optimization requirement associated with the computing application. The optimization requirement may be provided to the smart scheduler (that may be implemented as the system 400 of FIG. 4) by an administrator. The optimization requirement comprises one or more parameters indicating optimization criteria, such as, for example, lowest cost or highest performance. At operation 550, the matching module 410 of FIG. 4 performs matching of the application requirement with the resource inventory based on the optimization requirement. At operation 560, the configuration module 412 of FIG. 4 generates an optimized application deployment configuration based on the result of the matching and causes launching of the computing application within the virtualization service using the optimized application deployment configuration.

Figure 6:
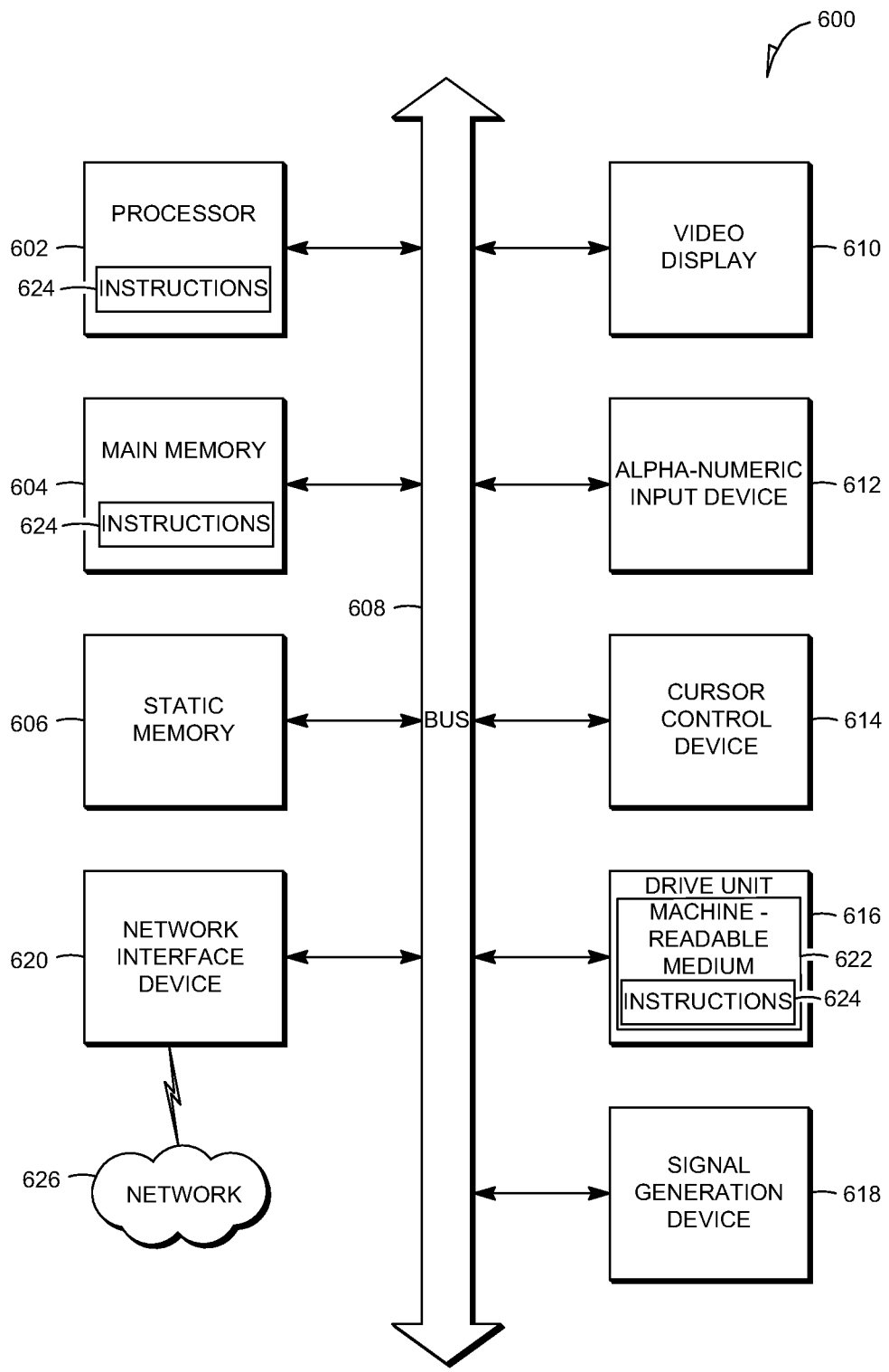
FIG. 6 is a diagrammatic representation of a machine in the example form of a computer system within which a set of instructions, for causing the machine to perform any one or more of the methodologies discussed herein, may be executed.

FIG. 6 is a diagrammatic representation of a machine in the example electronic form of a computer system 600 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) cursor control device 614 (e.g., a mouse), a disk drive unit 616, a signal generation device 618 (e.g., a speaker) and a network interface device 620.

The disk drive unit 616 includes a computer-readable (or machine-readable) medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and system to deploy a computing application on a cloud have been described. While some example approaches described herein may be used with ADOBE® products, the techniques described herein may be utilized beneficially with various other products.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
   detecting at a host computer system, a request to launch a computing application within a virtualization service, the request received by a scheduler of the host computing system;
   determining, by the scheduler, an application requirement for the computing application;
   determining, by the scheduler, a cloud resource inventory, the cloud resource inventory indicating resources available for executing the computing application within the virtualization service;
   determining, by the scheduler, an optimization requirement, the optimization requirement comprising one or more parameters indicating optimization criteria associated with a cost to use the resources available for executing the computing application within the virtualization service;
   matching, by the scheduler, the application requirement with resources of the cloud resource inventory that satisfy the optimization requirement to provide a matching result;
   generating an optimized application deployment configuration based on the matching result by calling, via the scheduler, an application programming interface of the virtualization service to trigger loading of one or more machine images associated with the requested computing application using the optimized application deployment configuration; and
   causing launching of the computing application within the virtualization service using the loaded one or more machine images.

2. The method of claim 1, wherein the optimized application deployment configuration indicates one or more virtualization service providers to be utilized for launching the computing application within the virtualization service.

3. The method of claim 1, wherein the optimized application deployment configuration indicates the number of instances of a virtual machine to be started to launch the computing application.

4. The method of claim 1, wherein the optimized application deployment configuration indicates type and capacity of each virtual machine to be executing one or more components of the computing application.

5. The method of claim 1, wherein the application requirement comprises a list of components of the computing application and relationship among the components.

6. The method of claim 1, wherein the application requirement comprises information indicating bandwidth and latency requirement for the components of the computing application.

7. The method of claim 1, wherein the application requirement comprises information indicating security requirement for the components of the computing application.

8. The method of claim 1, wherein the optimization requirement is associated with performance of the computing application.

9. The method of claim 1, wherein the virtualization service is provided by a first provider and a second provider, wherein a first component of the computing application is to be launched on an instance of a virtual machine provided by the first provider and a second component of the computing application is to be launched on an instance of a virtual machine provided by the second provider.

10. A computer-implemented system comprising:
    a memory coupled to one or more processors, the one or more processors implementing a scheduler comprising:
    a launch request detector to detect a request to launch a computing application within a virtualization service;
    an application requirement detector to determine an application requirement for the computing application;
    a cloud resource inventory detector to determine cloud resource inventory, the cloud resource inventory indicating resources available for executing the computing application within the virtualization service;
    an optimization requirement detector to determine an optimization requirement, the optimization requirement comprising one or more parameters indicating optimization criteria associated with a cost to use the resources available for executing the computing application within the virtualization service;
    a matching module to perform matching of the application requirement with resources of the cloud resource inventory that satisfy the optimization requirement to provide a matching result; and
    a configuration module to:
      generate an optimized application deployment configuration based on the matching result by calling an application programming interface of the virtualization service to trigger loading of one or more machine images associated with the requested computing application using the optimized application deployment configuration, and
      cause launching of the computing application within the virtualization service using the loaded one or more machine images.

11. The system of claim 10, wherein the optimized application deployment configuration indicates one or more virtualization service providers to be utilized for launching the computing application within the virtualization service.

12. The system of claim 10, wherein the optimized application deployment configuration indicates the number of instances of a virtual machine to be started to launch the computing application.

13. The system of claim 10, wherein the optimized application deployment configuration indicates type and capacity of each virtual machine to be executing one or more components of the computing application.

14. The system of claim 10, wherein the application requirement comprises a list of components of the computing application and relationship among the components.

15. The system of claim 10, wherein the application requirement comprises information indicating bandwidth and latency requirement for the components of the computing application.

16. The system of claim 10, wherein the application requirement comprises information indicating security requirement for the components of the computing application.

17. The system of claim 10, wherein the virtualization service is provided by a first provider and a second provider, wherein a first component of the computing application is to be launched on an instance of a virtual machine provided by the first provider and a second component of the computing application is to be launched on an instance of a virtual machine provided by the second provider.

18. A machine-readable non-transitory medium having instruction data to cause a machine to perform operations comprising:
    detect a request received by a scheduler of a host computing system to launch a computing application within a virtualization service;
    determine, by the scheduler, an application requirement for the computing application;

determine, by the scheduler, a cloud resource inventory, the cloud resource inventory indicating resources available for executing the computing application within the virtualization service;

determine, by the scheduler, an optimization requirement, the optimization requirement comprising one or more parameters indicating optimization criteria associated with a cost to use the resources available for executing the computing application within the virtualization service;

match, by the scheduler, the application requirement with resources of the cloud resource inventory that satisfy the optimization requirement to provide a matching result; and generate an optimized application deployment configuration based on the matching result by calling, via the scheduler, an application programming interface of the virtualization service to trigger loading of one or more machine images associated with the requested computing application using the optimized application deployment configuration; and cause launching of the computing application within the virtualization service using the loaded one or more machine images.

19. The machine-readable non-transitory medium of claim 18, wherein the generated optimized application deployment configuration is based on a matching result associated with matching cost-effective resources of the cloud resource inventory that satisfy the optimization requirement to the application requirement.

\* \* \* \* \*